US012107342B2

(12) United States Patent
Chen et al.

(10) Patent No.: US 12,107,342 B2
(45) Date of Patent: Oct. 1, 2024

(54) MULTIBAND ANTENNA

(71) Applicant: ALPHA NETWORKS INC., Hsinchu (TW)

(72) Inventors: Guan-Ting Chen, Hsinchu (TW); Kuang-Wei Lin, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 0 days.

(21) Appl. No.: 18/078,611

(22) Filed: Dec. 9, 2022

(65) Prior Publication Data

US 2024/0039158 A1 Feb. 1, 2024

(30) Foreign Application Priority Data

Jul. 28, 2022 (TW) ................................ 111128448

(51) Int. Cl.
*H01Q 5/307* (2015.01)
*H01Q 5/28* (2015.01)
(Continued)

(52) U.S. Cl.
CPC ............... *H01Q 5/28* (2015.01); *H01Q 5/307* (2015.01); *H01Q 5/357* (2015.01); *H01Q 5/364* (2015.01);
(Continued)

(58) Field of Classification Search
CPC ........ H01Q 5/307; H01Q 5/357; H01Q 5/364; H01Q 5/371; H01Q 5/40; H01Q 9/0421
See application file for complete search history.

(56) References Cited

U.S. PATENT DOCUMENTS 6,639,555 B1 * 10/2003 Kane ........................ H01Q 1/36 343/815
8,648,756 B1 * 2/2014 Desclos ................... H01Q 5/35 343/702
(Continued)

FOREIGN PATENT DOCUMENTS

CN 1359552 A * 7/2002 ............ H01Q 1/243
CN 112821042 A 5/2021
(Continued)

OTHER PUBLICATIONS

United Kingdom Search Report for United Kingdom Application No. 2218558.1, dated Jun. 8, 2023.
(Continued)

*Primary Examiner* — Dameon E Levi
*Assistant Examiner* — Leah Rosenberg
(74) *Attorney, Agent, or Firm* — Birch, Stewart, Kolasch & Birch, LLP

(57) ABSTRACT

A multiband antenna includes a first radiator, a feed element, a first ground element, a second radiator, a connecting element, and a second ground element, wherein the first radiator is made of a metal plate. The feed element is electrically connected to the first radiator and is adapted to feed a signal. The first ground element is electrically connected to the first radiator. The second radiator is made of a metal plate and surrounds an outer side of the first radiator, wherein the first radiator and the second radiator are spaced by an interval. The connecting element is electrically connected to the first radiator and the second radiator. The second ground element is electrically connected to the second radiator. In this way, the multiband antenna is suitable for transmitting signals in multiple frequency bands.

9 Claims, 19 Drawing Sheets

(51) Int. Cl.

| | |
|---|---|
| ***H01Q 5/357*** | (2015.01) |
| ***H01Q 5/364*** | (2015.01) |
| ***H01Q 5/371*** | (2015.01) |
| ***H01Q 5/40*** | (2015.01) |
| ***H01Q 9/04*** | (2006.01) |
| ***H01Q 9/44*** | (2006.01) |

(52) U.S. Cl.

CPC ............... *H01Q 5/371* (2015.01); *H01Q 5/40* (2015.01); *H01Q 9/0421* (2013.01); *H01Q 9/44* (2013.01)

(56) References Cited

U.S. PATENT DOCUMENTS 10,153,551 B1 12/2018 Hong et al.
2003/0122718 A1* 7/2003 Fang ...................... H01Q 5/378 343/702
2004/0053635 A1* 3/2004 Haapala ............... H03G 3/3042 455/522
2011/0037657 A1 2/2011 Yang

FOREIGN PATENT DOCUMENTS

DE 199 29 689 A1 1/2001
EP 1 067 627 A1 1/2001
JP 2000-59129 A 2/2000
TW 201530902 A 8/2015

OTHER PUBLICATIONS

Taiwanese Search Report for Taiwanese Application No. 111128448, dated Aug. 8, 2023, with English translation.

* cited by examiner

MULTIBAND ANTENNA

BACKGROUND OF THE INVENTION

Technical Field

The present invention relates generally to a metal antenna, and more particularly to a multiband antenna suitable for multiple frequency bands.

Description of Related Art

With the development of technology, the uses of wireless signals increase gradually. Conventional wireless communication products, such as mobile phones, tablets, laptops, and other Wi-Fi wireless communication devices, typically receive or send a wireless signal via a metal antenna, wherein the metal antenna mainly makes use of a frequency band of 2.4 GHz band or 5 GHz band. With the development of Wi-Fi 6E products, the use of 6 GHz band is introduced.

The metal antenna of the Wi-Fi 6E wireless communication products typically adopts a planar inverted F antenna or a monopole antenna which is only suitable for a single frequency band. As a result, the Wi-Fi 6E wireless communication products that suit for multiple frequency bands require a plurality of antennas, increasing a volume occupied by the antennas and thereby increasing an overall volume of the wireless communication products.

BRIEF SUMMARY OF THE INVENTION

In view of the above, the primary objective of the present invention is to provide a multiband antenna suitable for wireless communication products using multiple frequency bands.

The present invention provides a multiband antenna including a first radiator, a feed element, a first ground element, a second radiator, a connecting element, and a second ground element, wherein the first radiator is made of a metal plate. The feed element is electrically connected to the first radiator and is adapted to feed a signal. The first ground element is electrically connected to the first radiator and is adapted to ground the first radiator. The second radiator is made of a metal plate and surrounds a part of an outer side of the first radiator, wherein the first radiator and the second radiator are spaced by an interval. The connecting element is electrically connected to the first radiator and the second radiator. The second ground element is electrically connected to the second radiator and is adapted to ground the second radiator.

With the aforementioned design, the multiband antenna of the present invention feeds signals via one feed element and has two radiators suitable for transmitting signals in multiple frequency bands, effectively relieving the drawback of the conventional wireless communication product that requires a plurality of antennas.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
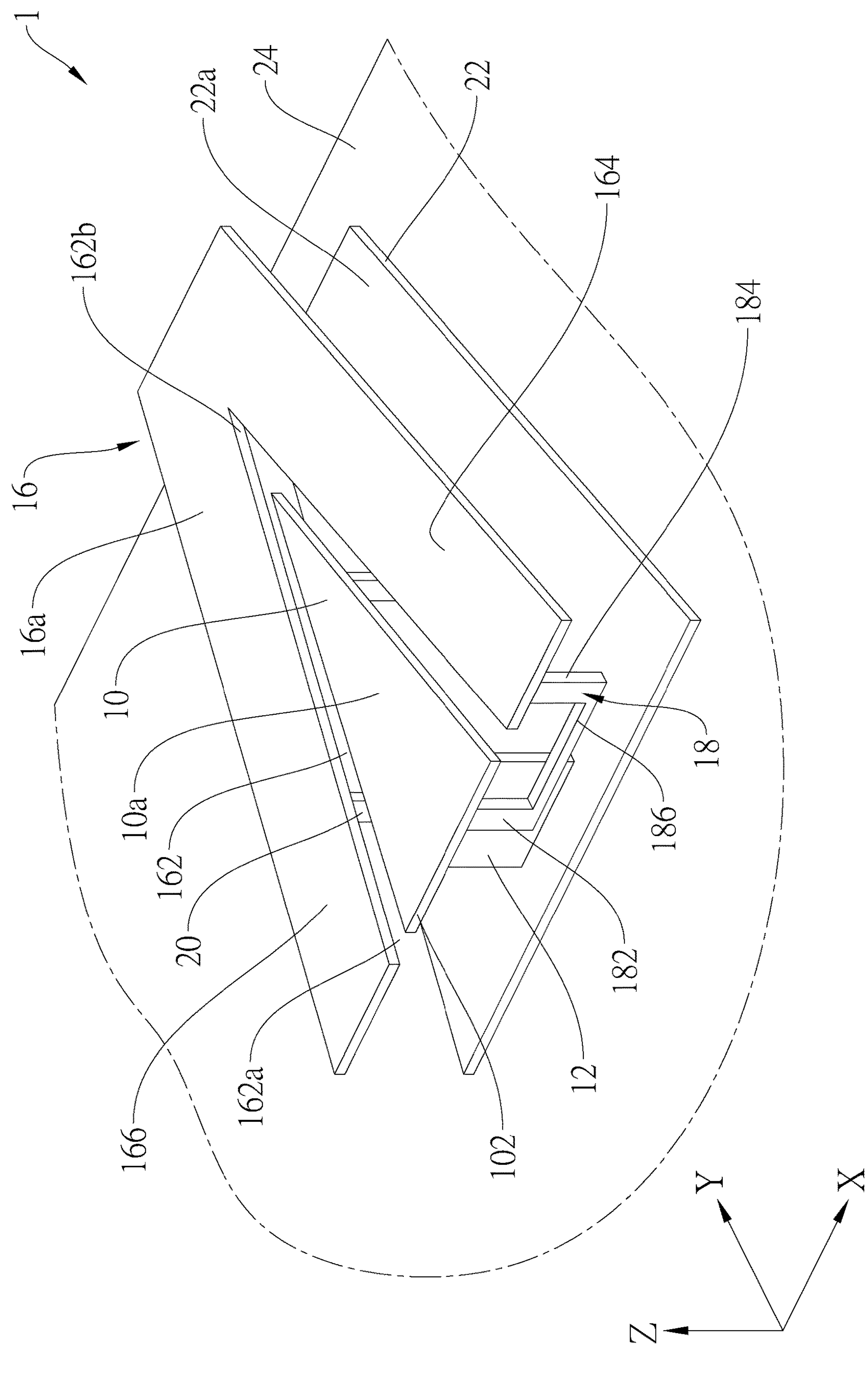
FIG. 1 is a perspective view of the multiband antenna according to a first embodiment of the present invention.
Figure 2:
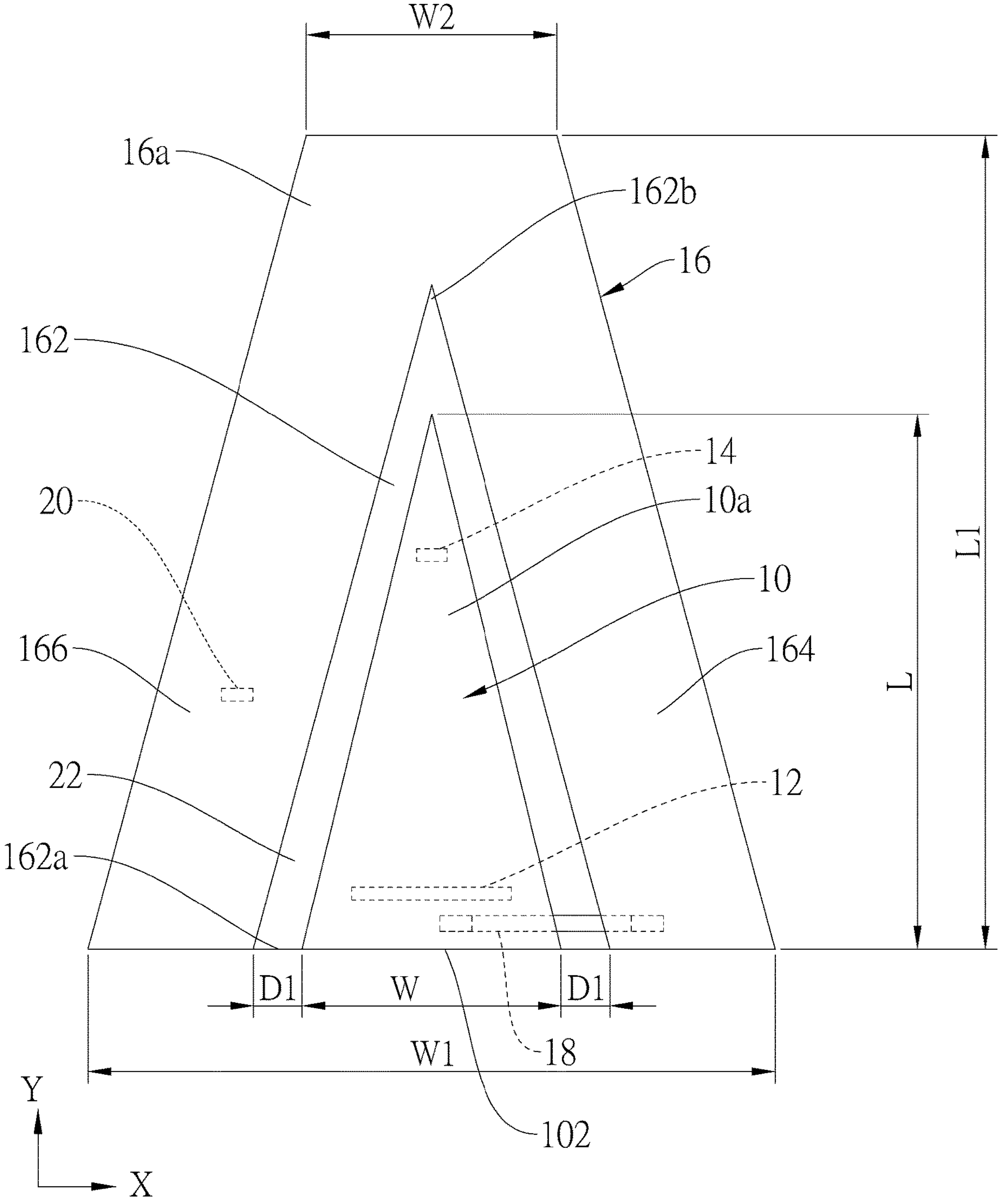
FIG. 2 is a top view of the multiband antenna according to the first embodiment of the present invention.

A multiband antenna 1 according to a first embodiment of the present invention is illustrated in FIG. 1 to FIG. 7 and includes a first radiator 10, a feed element 12, a first ground element 14, a second radiator 16, a connecting element 18, and a second ground element 20. In the current embodiment, the multiband antenna 1 is applied to a Wi-Fi wireless communication device as an example, wherein a frequency band of the multiband antenna 1 could be 2 GHz band, 5 GHz band, 6 GHz band, etc. In order to illustrate easily, a first axial direction X, a second axial direction Y, and a third axial direction Z which are perpendicular to one another should be interpreted from a perspective view in FIG. 1.

The first radiator 10 is made of a metal plate. In the current embodiment, the first radiator 10 is, but not limited to, a triangular metal plate, such as an isosceles triangle. The first radiator 10 has an edge 102 (i.e., a base of the triangle), and a width of the first radiator 10 in the first axial direction X gradually decreases along the second axial direction Y from the edge 102 to another end of the first radiator 10 opposite to the edge 102. The first radiator 10 has a first surface 10*a* and a second surface 10*b* opposite to the first surface 10*a* in the third axial direction Z, wherein the first surface 10*a* faces an outer side of the multiband antenna 1. In the current embodiment, a length L of the first radiator 10 in the second axial direction Y is about 16.77 mm, and a width W of the edge 102 in the first axial direction X is about 8.1 mm.

The feed element 12 is electrically connected to the first radiator 10 and is adapted to feed a signal. In the current embodiment, the feed element 12 is a metal plate and is located on a side of the second surface 10*b*, wherein an end of the feed element 12 is connected to the second surface 10*b*, and another end of the feed element 12 is adapted to feed the signal. A width of the feed element 12 extends along the first axial direction X, and a length of the feed element 12 extends along the third axial direction Z.

The first ground element 14 is electrically connected to the first radiator 10, and is adapted to ground the first radiator 10. In the current embodiment, the first ground element 14 is a metal plate and is located on the side of the second surface 10*b* (i.e., both the first ground element 14 and the feed element 12 are located on the side of the second surface 10*b*). An end of the first ground element 14 is connected to the second surface 10*b*. The first ground element 14 and the feed element 12 are spaced by a distance D in the second axial direction Y, wherein the distance D is about 10.2 mm. A width of the first ground element 14 extends along the first axial direction X, and a length of the first ground element 14 extends along the third axial direction Z.

The second radiator 16 is made of a metal plate and surrounds a part of an outer side of the first radiator 10, wherein an inner peripheral edge of the second radiator 16 and an outer peripheral edge of the first radiator 10 are spaced by an interval. In the current embodiment, the second radiator 16 recesses along the second axial direction Y to form a receiving groove 162, wherein the receiving groove 162 has an open side 162*a* and a closed side 162*b* opposite to the open side 162*a* in the second axial direction Y. A width of the receiving groove 162 in the first axial direction X gradually decreases from the open side 162*a* to the closed side 162*b*. At least one part of the first radiator 10 is located in the receiving groove 162, and the edge 102 corresponds to the open side 162*a*, and the width of the first radiator 10 in the first axial direction X gradually decreases from the open side 162*a* to the closed side 162*b*. More specifically, the second radiator 16 includes a first arm 164 and a second arm 166 that are respectively located on two opposite sides of the first radiator in the first axial direction X to be in a V-shape, and a space between the first arm 164 and the second arm 166 forms the receiving groove 162. The first arm 164 and the second arm 166 surround the at least one part of the first radiator 10. The first radiator 10 has two side edges, wherein the first arm 164 is spaced with and parallel to one of the two side edges of the first radiator 10, and the second arm 166 is spaced with and parallel to the other side edge of the first radiator 10. The closed side 162*b* of the receiving groove 162 is formed by connecting an end of the first arm 164 to an end of the second arm 166, and the open side 162*a* of the receiving groove 162 is formed between another end of the first arm 164 and another end of the second arm 166. The edge 102 of the first radiator 10 is, but not limited to, aligned with both the another end of the first arm 164 and the another end of the second arm 166 in the first axial direction X. In other embodiments, the edge 102 of the first radiator could slightly protrude relative to the open side 162*a* in the second axial direction Y or slightly retract into the receiving groove 162 in the second axial direction Y. The edge 102 of the first radiator 10 has two ends in the first axial direction X. A distance D1 between one of two ends of the edge 102 of the first radiator 10 and the first arm 164 in the first axial direction X and a distance D1 between the other end of the edge 102 of the first radiator 10 and the second arm 166 are respectively about 1.52 mm, wherein each of the distances D1 is equal to the interval between the inner peripheral edge of the second radiator 16 and the outer peripheral edge of the first radiator 10.

The second radiator 16 has a third surface 16*a* and a fourth surface 16*b* opposite to the third surface 16*a* in the third axial direction Z, wherein the third surface 16*a* faces the outer side of the multiband antenna 1 (i.e., the third surface 16*a* of the second radiator 16 and the first surface 10*a* of the first radiator 10 face the same direction). A length L1 of the second radiator 16 in the second axial direction Y is about 25.5 mm. The second radiator 16 has two ends in the second axial direction Y, wherein a width W1 of one of the two ends of the second radiator 16 that is closer to the open side 162*a* than the closed side 162*b* in the first axial direction X is about 21.5 mm, and a width W2 of the other end of the second radiator 16 in the first axial direction X is about 7.8 mm.

The connecting element 18 is electrically connected to both the first radiator and the second radiator 16 and is adapted to transmit a resonant current. In the current embodiment, the connecting element 18 is located on the side of the second surface 10*b* and a side of the fourth surface 16*b* that is closer to the open side 162 than the closed side 162*b*, and two ends of the connecting element 18 are respectively connected to the second surface and the fourth surface 16*b*, thereby preventing a radiation on a horizontal plane (i.e., an X-Y plane) of the first radiator 10 and the second radiator 16 from being affected by the connecting element 18. More specifically, the connecting element 18 has two vertical sections 182, 184 and a horizontal section 186, wherein each of the vertical sections 182, 184 extends along the third axial direction Z. An end of one of the vertical sections (i.e., the vertical section 182) of the connecting element 18 is located between the feed element 12 and the edge 102 of the first radiator 10 in the second axial direction Y, and an end of the other vertical section 184 is connected to the first arm 164, wherein a distance D2 between the two vertical sections 182, 184 in the first axial direction X is about 5 mm. The horizontal section 186 extends along the first axial direction X, and two ends of the horizontal section 186 are respectively connected to another end of one of the vertical sections (i.e., the vertical section 182) and another end of the other vertical section 184.

Figure 5:
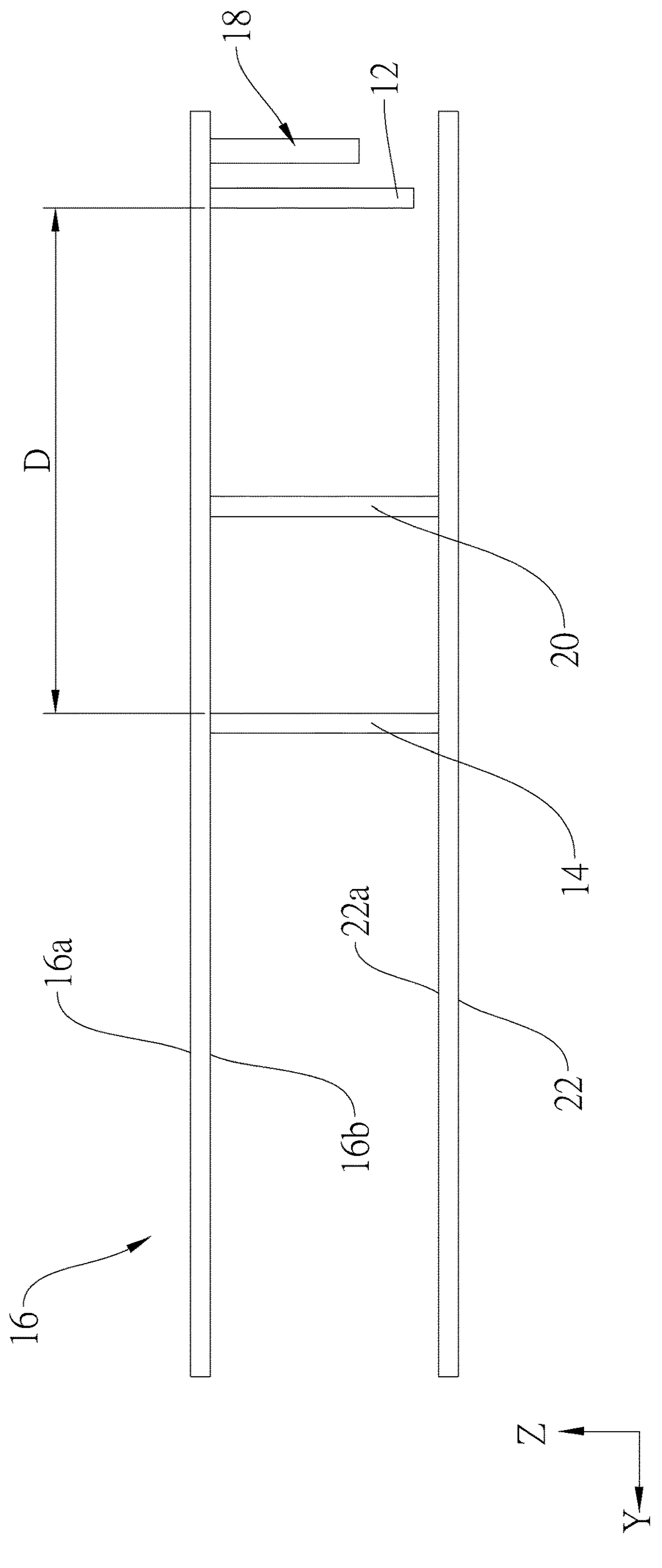
FIG. 5 is a left side view of the multiband antenna according to the first embodiment of the present invention.
Figure 6:
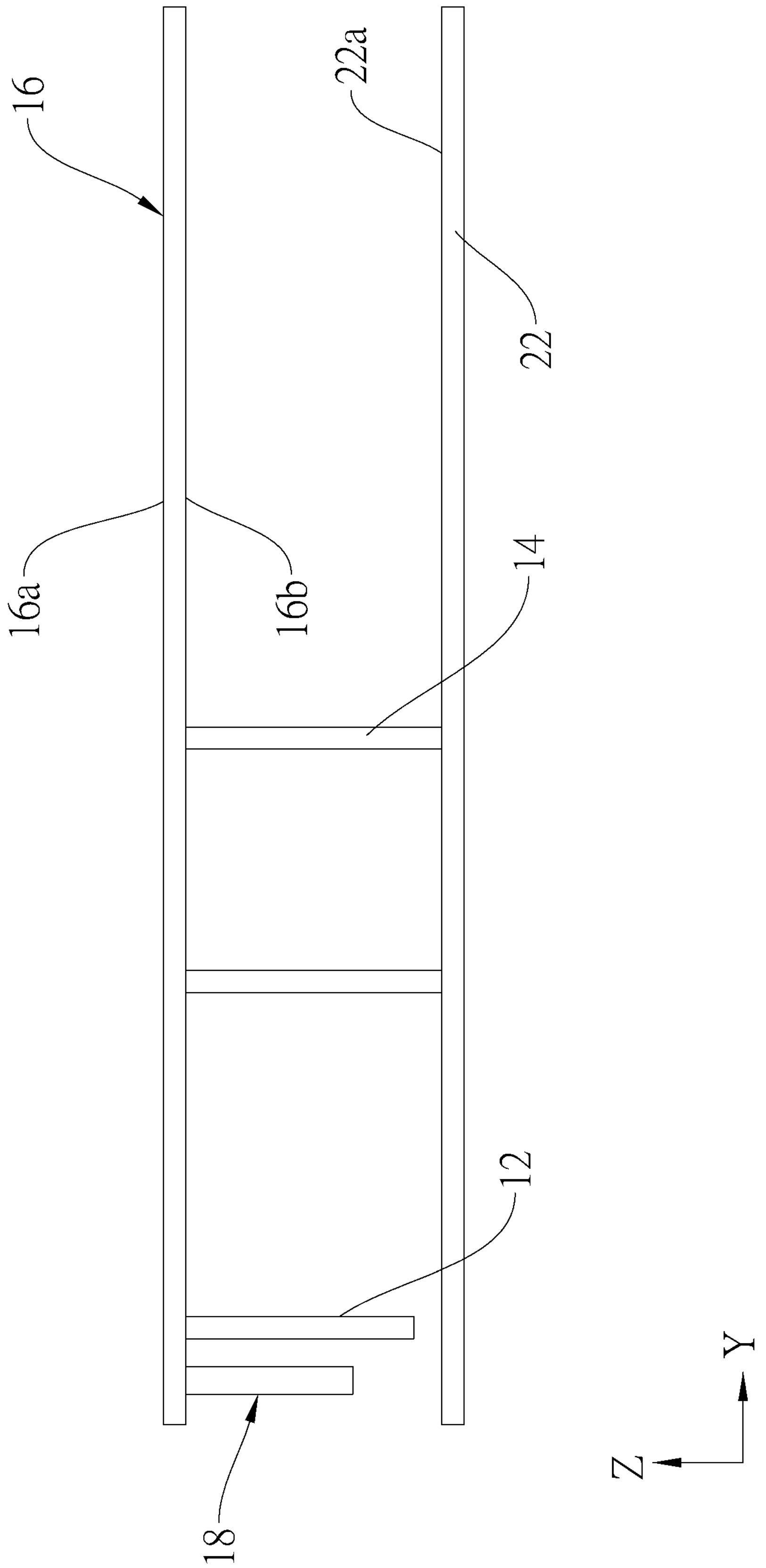
FIG. 6 is a right side view of the multiband antenna according to the first embodiment of the present invention.
Figure 7:
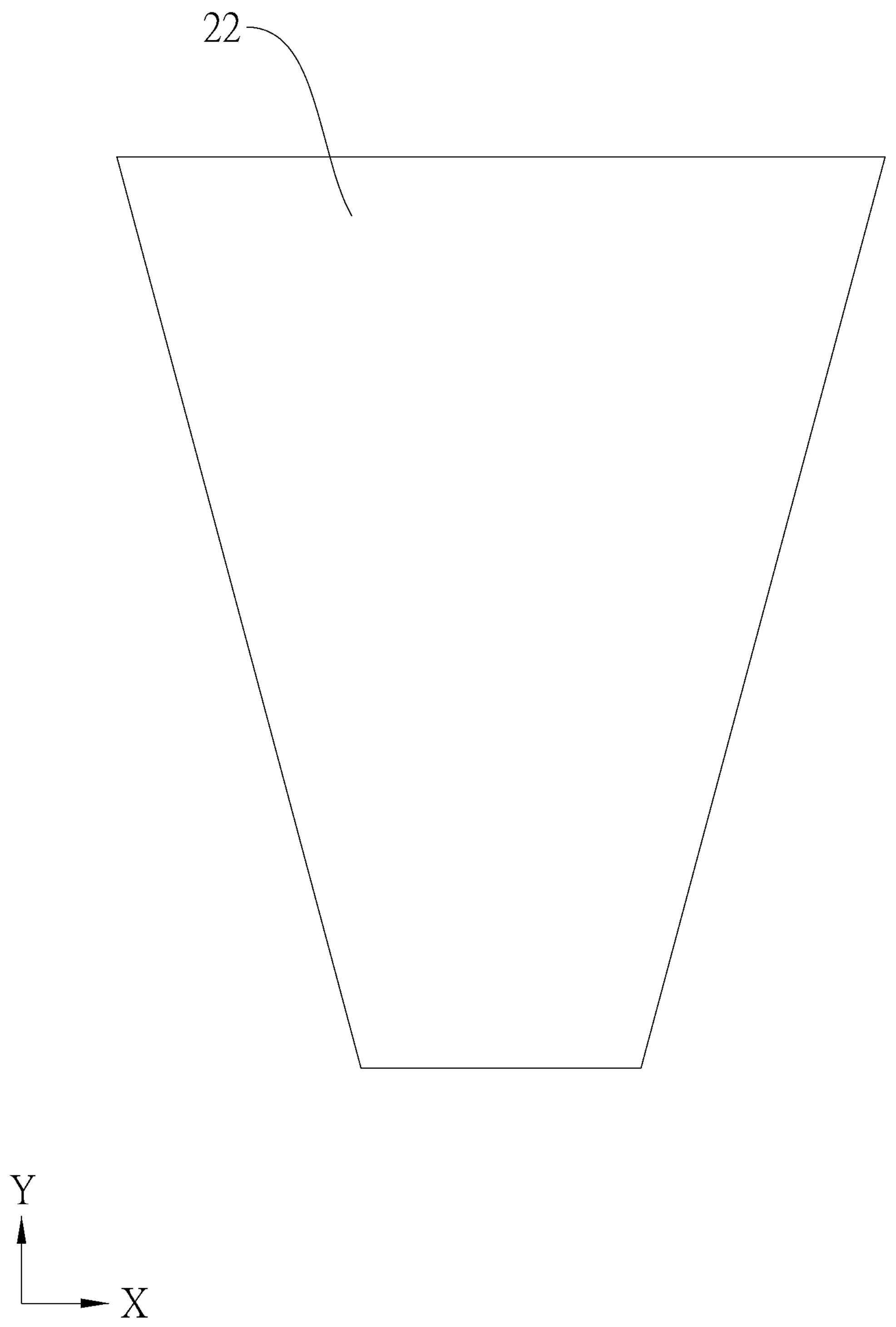
FIG. 7 is a bottom view of the multiband antenna according to the first embodiment of the present invention.

The second ground element 20 is electrically connected to the second radiator 16 and is adapted to ground the second radiator 16. Referring to FIG. 5, in the current embodiment, the second ground element 20 is a metal plate and is located on the side of the fourth surface 16*b* of the second radiator 16, wherein an end of the second ground element 20 is connected to the fourth surface 16*b* of the second arm 166 of the second radiator 16, and the second ground element 20 is located between the first ground element 14 and the feed element 12 in the second axial direction Y. The second ground element 20 and the first ground element 14 are electrically connected to the ground.

In the current embodiment, the multiband antenna 1 further includes a substrate 22 adapted to provide the ground of the first ground element 14 and the second ground element 20. The substrate 22 is a metal plate as an example.

Figure 3:
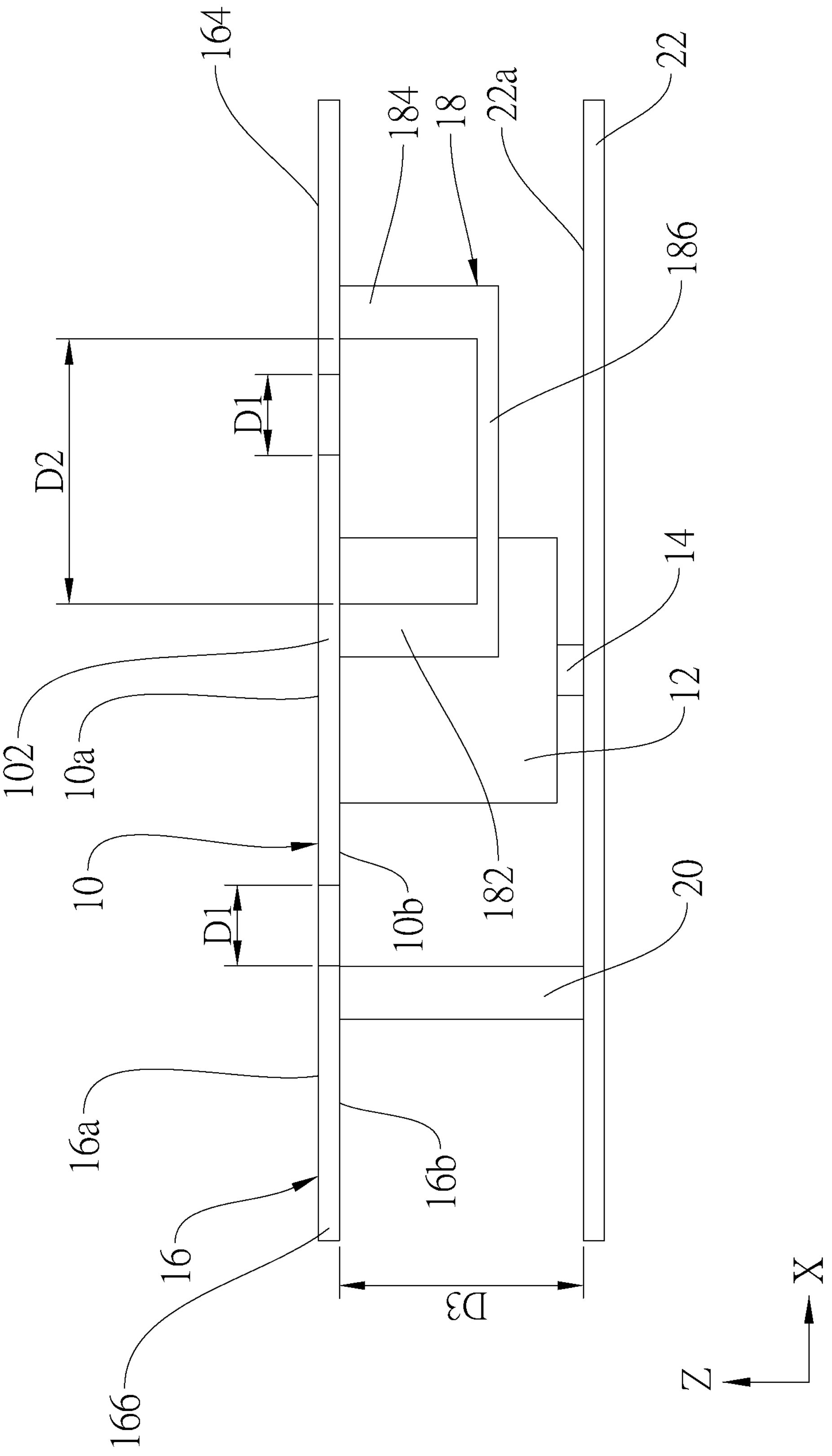
FIG. 3 is a front view of the multiband antenna according to the first embodiment of the present invention.
Figure 4:
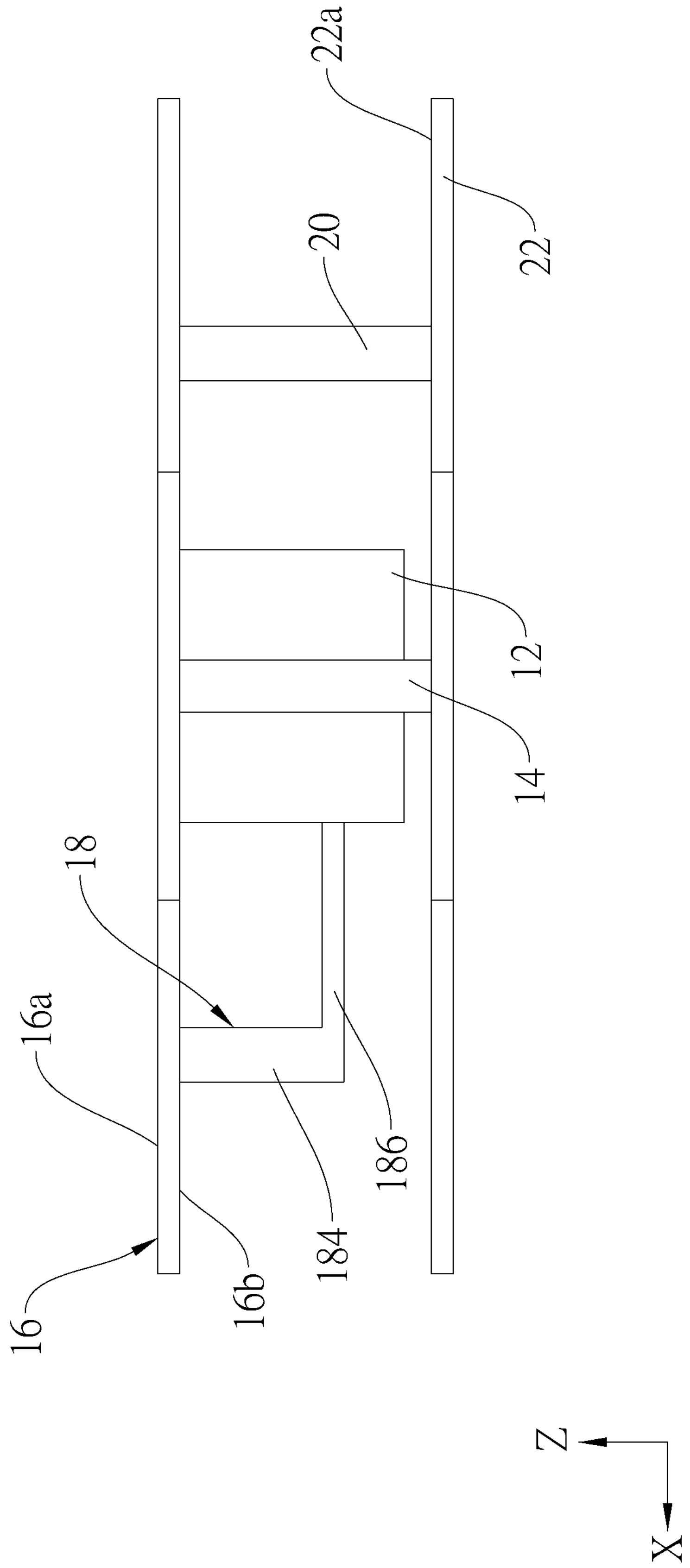
FIG. 4 is a rear view of the multiband antenna according to the first embodiment of the present invention.

In practice, the substrate 22 could be a printed circuit board. As shown in FIG. 1 and FIG. 3, a surface 22*a* of the substrate 22 is spaced with both the second surface 10*b* and the fourth surface 16*b* in the third axial direction Z, and another surface of the substrate 22 is engaged with a circuit board 24. The first ground element 14 is connected between the substrate 22 and the second surface 10*b* and the first radiator 10, and the second ground element 20 is connected between the substrate 22 and the fourth surface 16*b* on the second arm 166 of the second radiator 16. A distance D3 between the surface 22*a* of the substrate 22 and the second surface 10*b* in the third axial direction Z and a distance D3 between the surface 22*a* of the substrate 22 and the fourth surface 16*b* in the third axial direction Z are respectively between 4.5 mm and 5 mm. In the current embodiment, each of the distances D3 is about 4.6 mm.

The first radiator 10 is supported on the substrate 22 via the first ground element 14, and the second radiator 16 is supported on the substrate 22 via the second ground element 20. In other words, the first radiator 10 is solely supported on the substrate 22 by the first ground element 14, and the second radiator 16 is solely supported on the substrate 22 by the second ground element 20, without using other supporting components.

A resonant current path in high frequency (i.e., 4.5 GHz or above) is formed by the feed element 12 through the first radiator 10 to the first ground element 14, and a resonant current path in low frequency (i.e., 2 GHz to 3 GHz) is formed by the feed element 12 through the connecting element 18, the first arm 164, and the second arm 166 to the second ground element 20.

Figure 8:
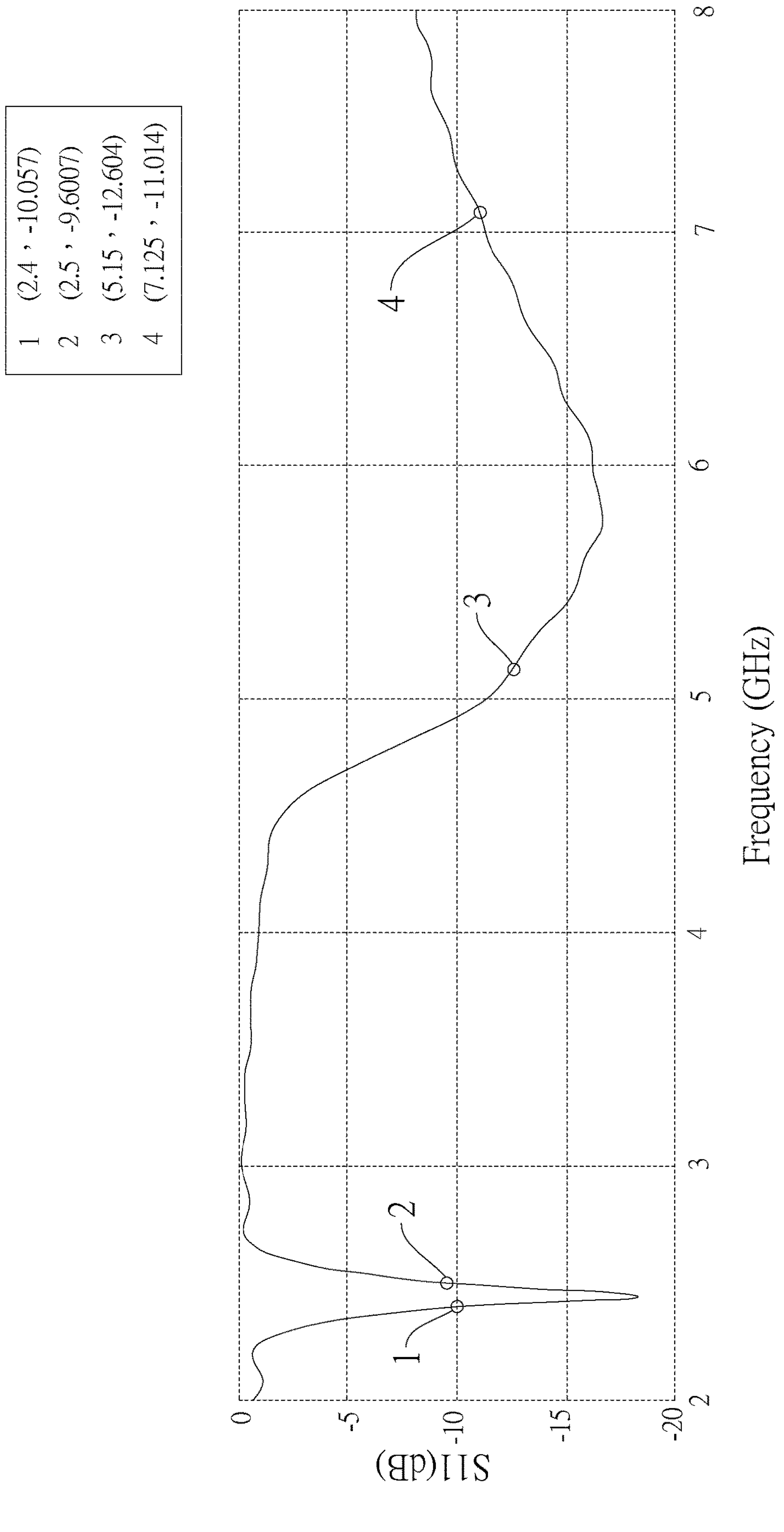
FIG. 8 is a schematic view showing a return loss of the multiband antenna according to the first embodiment of the present invention operating between 2 GHz and 8 GHz.

FIG. 8 is a schematic view showing a S11 return loss of the multiband antenna according to the first embodiment of the present invention operating between 2 GHz and 8 GHz bands, wherein the multiband antenna 1 has a resonant mode in the 2.4 GHz band and has a wideband resonant mode between 5 GHz and 6 GHz band, in which the fractional bandwidth is about 38%. As shown in FIG. 8, the frequency band covered by the multiband antenna 1 could support three frequency bands of the Wi-Fi 6E and Wi-Fi 7 (i.e., from the 2.4 GHz to 2.5 GHz band, from the 5.15 GHz to 5.85 GHz band, and from the 5.925 GHz to 7.125 GHz band).

Figure 9:
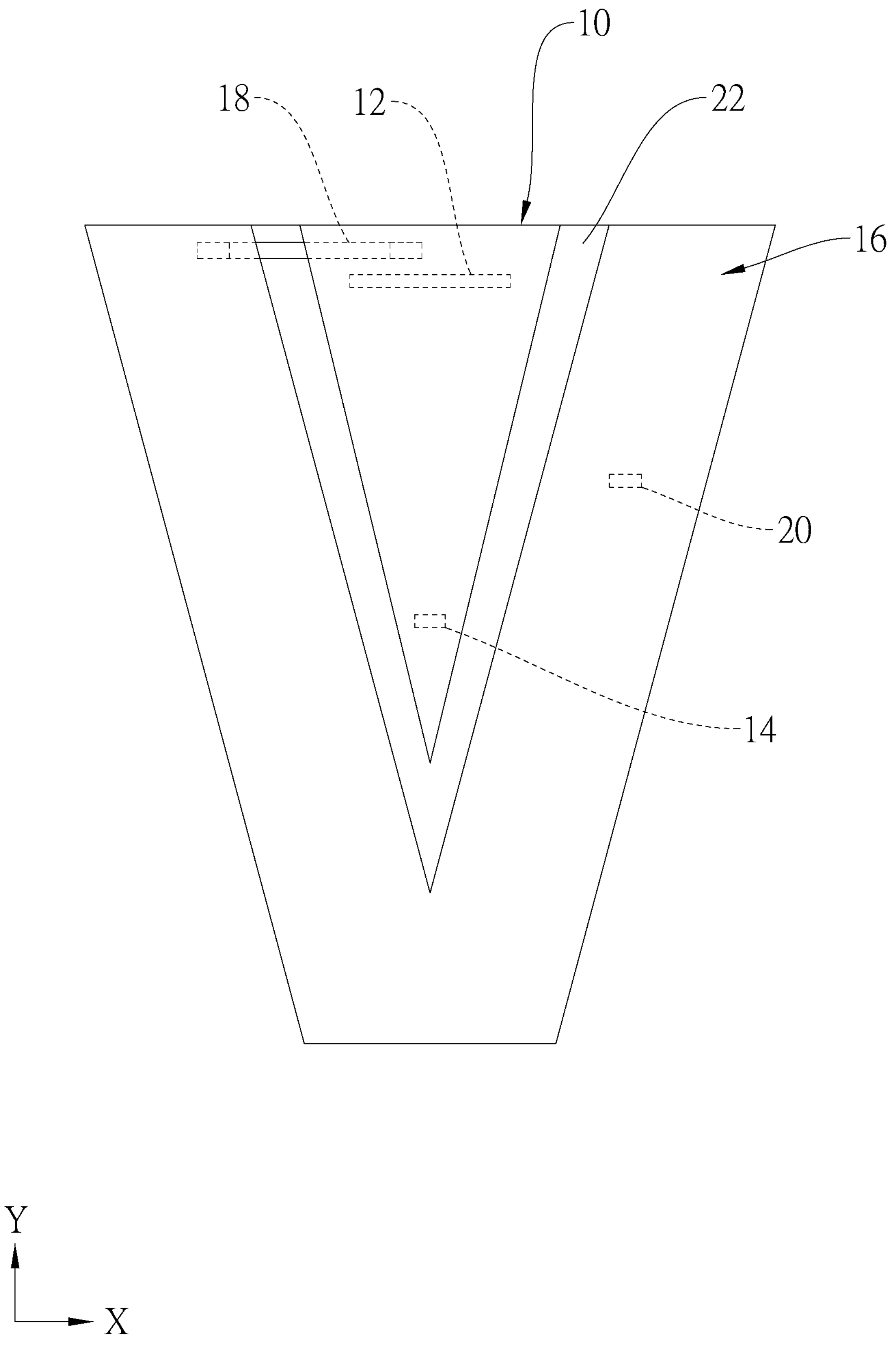
FIG. 9 is a top view of the multiband antenna according to the first embodiment of the present invention disposed in another direction.
Figure 10:
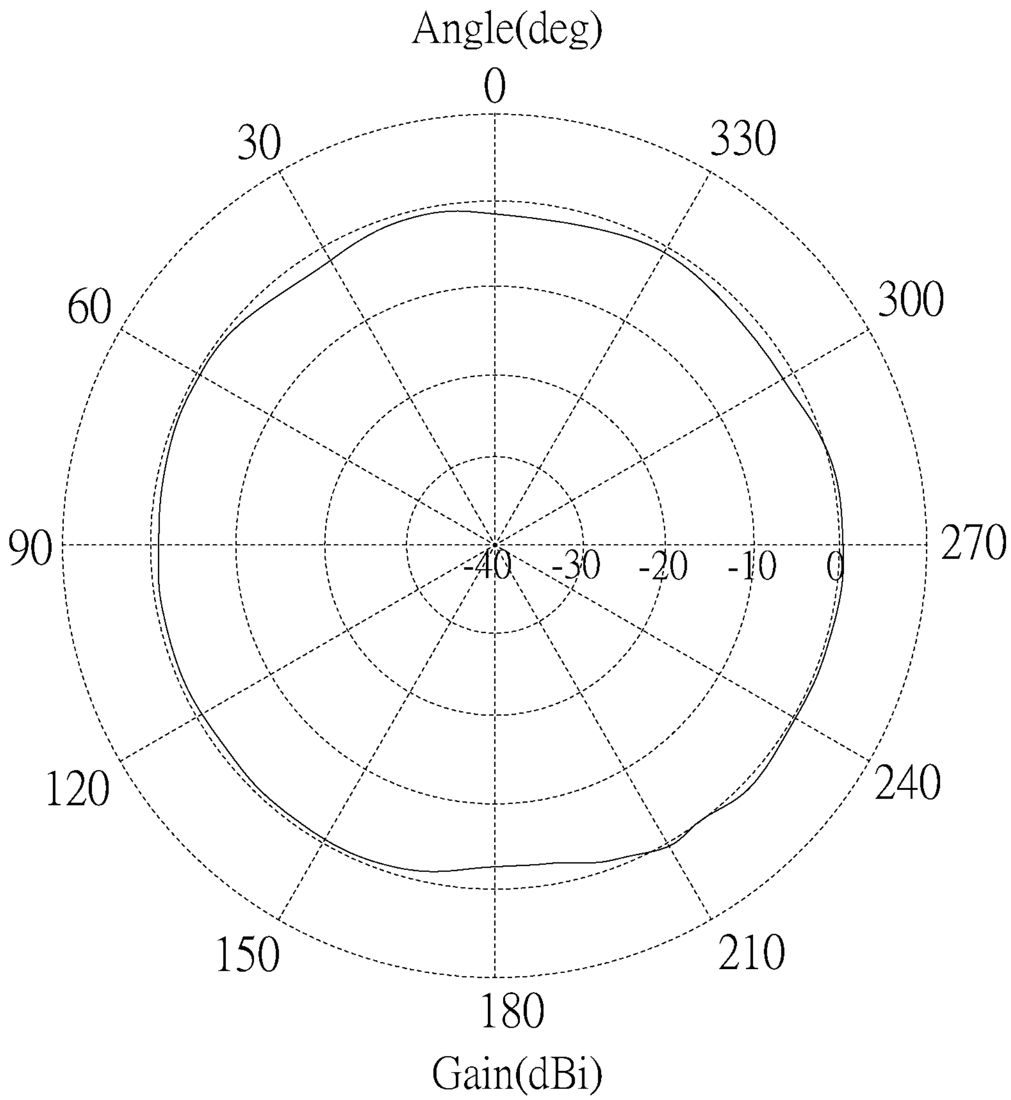
FIG. 10 is a schematic view showing a radiation pattern of the multiband antenna according to the first embodiment of the present invention operating at 2.45 GHz.
Figure 11:
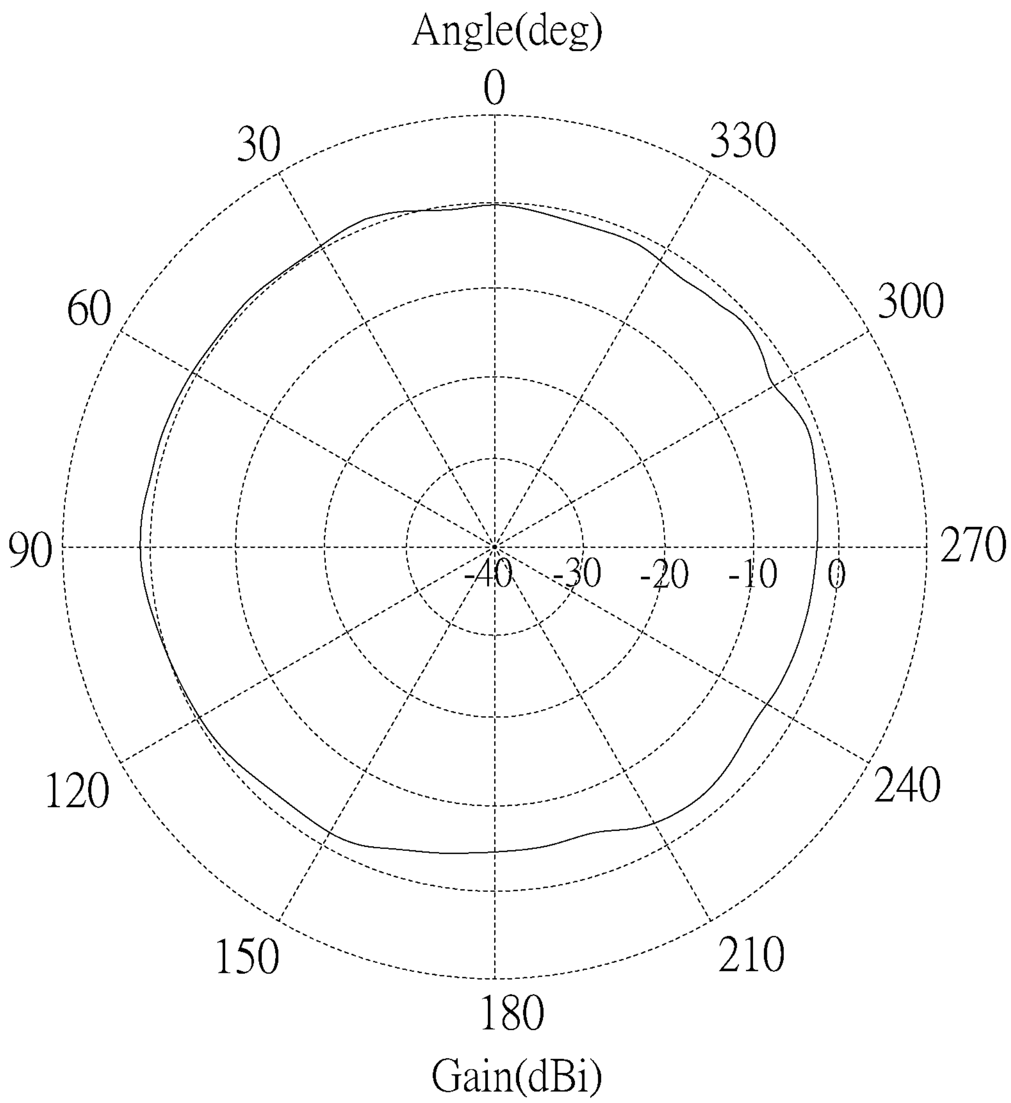
FIG. 11 is a schematic view showing a radiation pattern of the multiband antenna according to the first embodiment of the present invention operating at 5.5 GHz.
Figure 12:
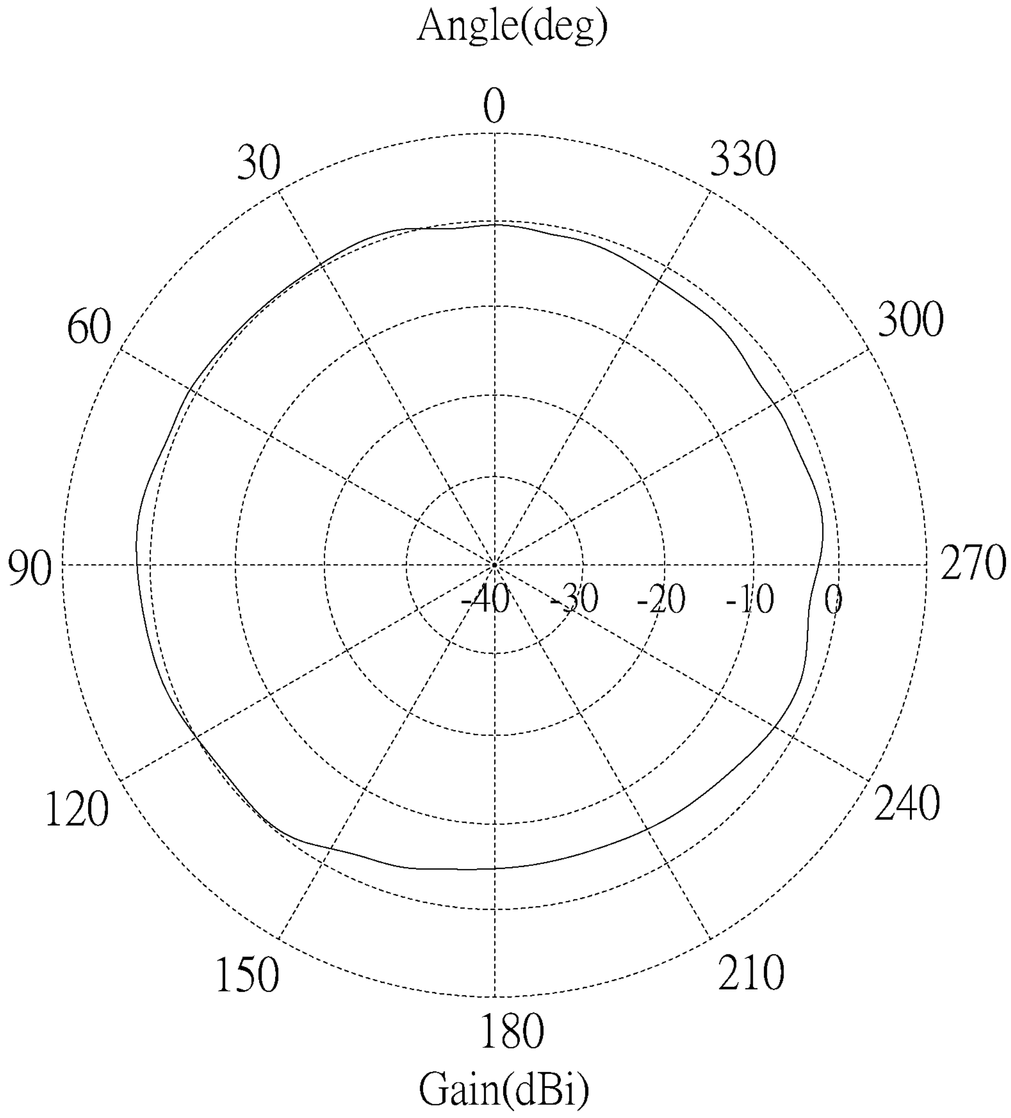
FIG. 12 is a schematic view showing a radiation pattern of the multiband antenna according to the first embodiment of the present invention operating at 6.5 GHz.
Figure 13:
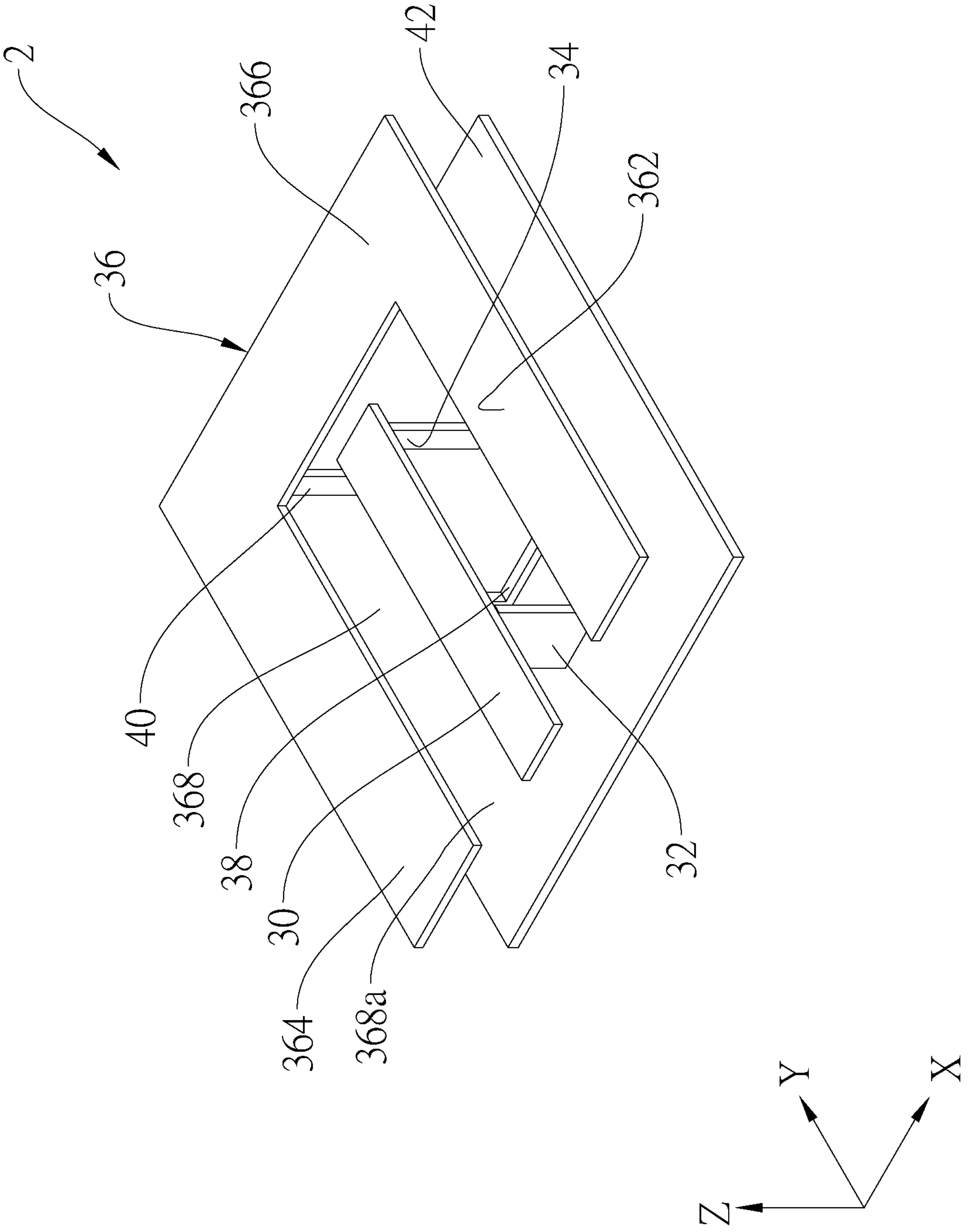
FIG. 13 is a perspective view of the multiband antenna according to a second embodiment of the present invention.
Figure 14:
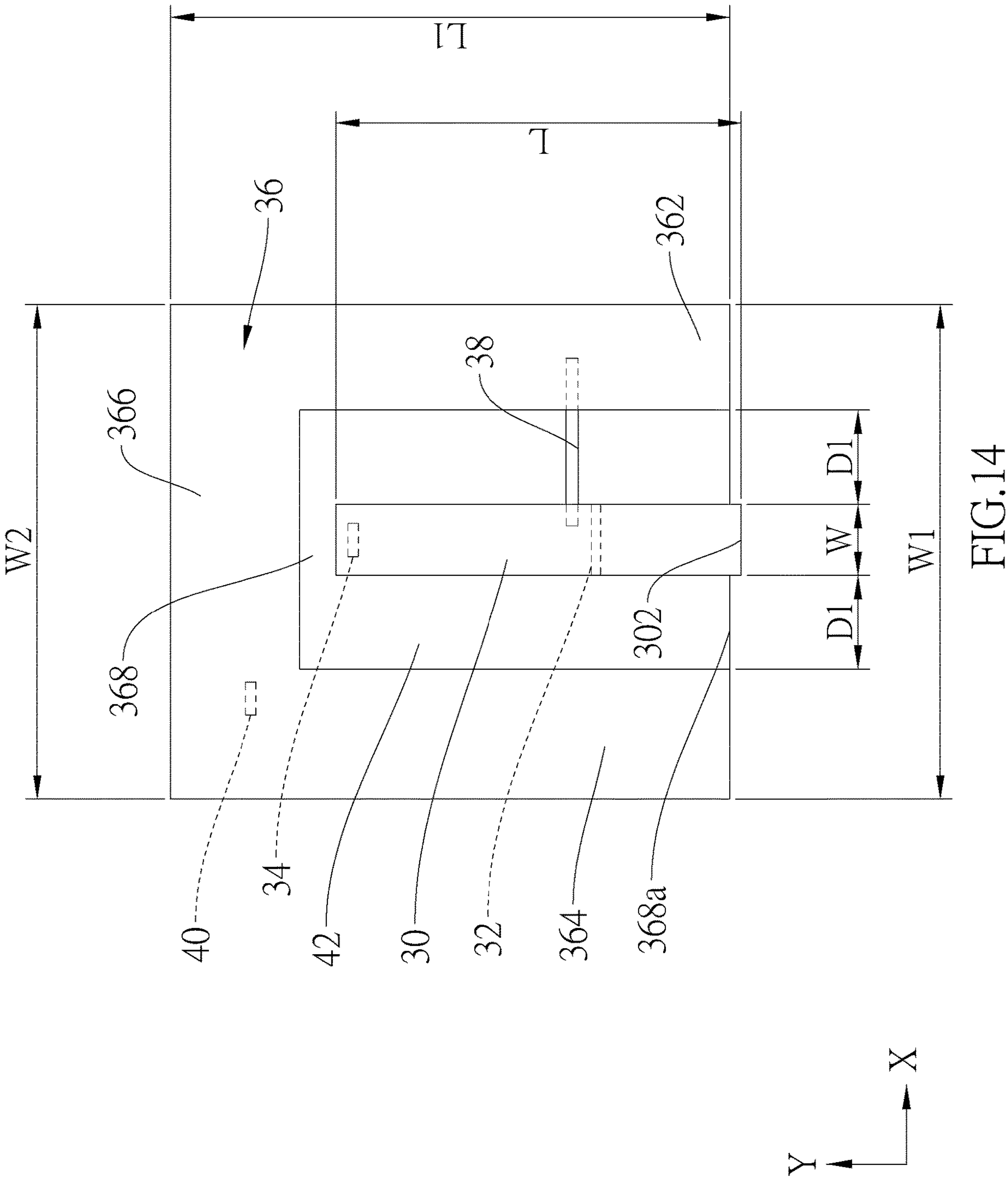
FIG. 14 is a top view of the multiband antenna according to the second embodiment of the present invention.
Figure 15:
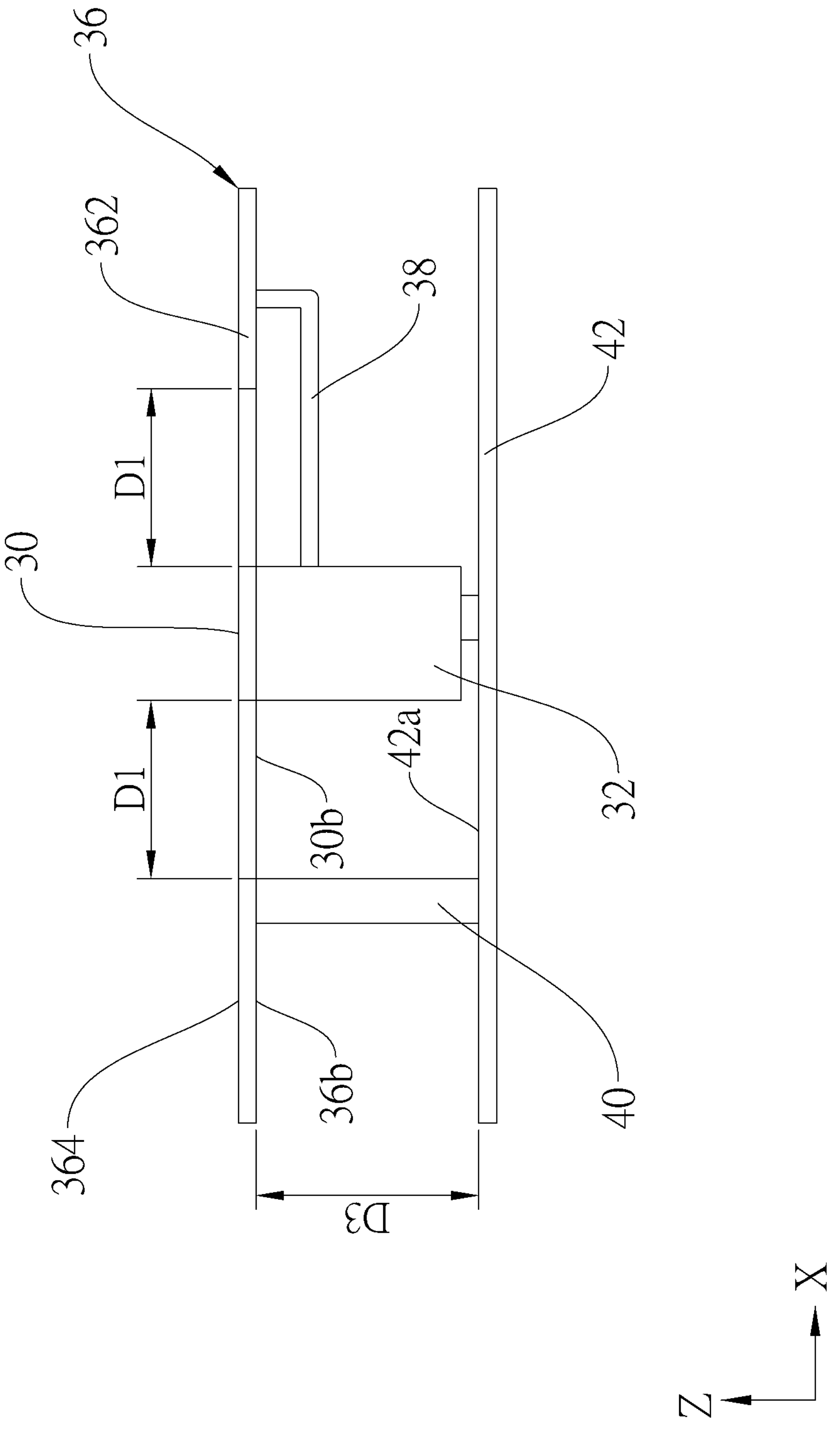
FIG. 15 is a front view of the multiband antenna according to the second embodiment of the present invention.
Figure 16:
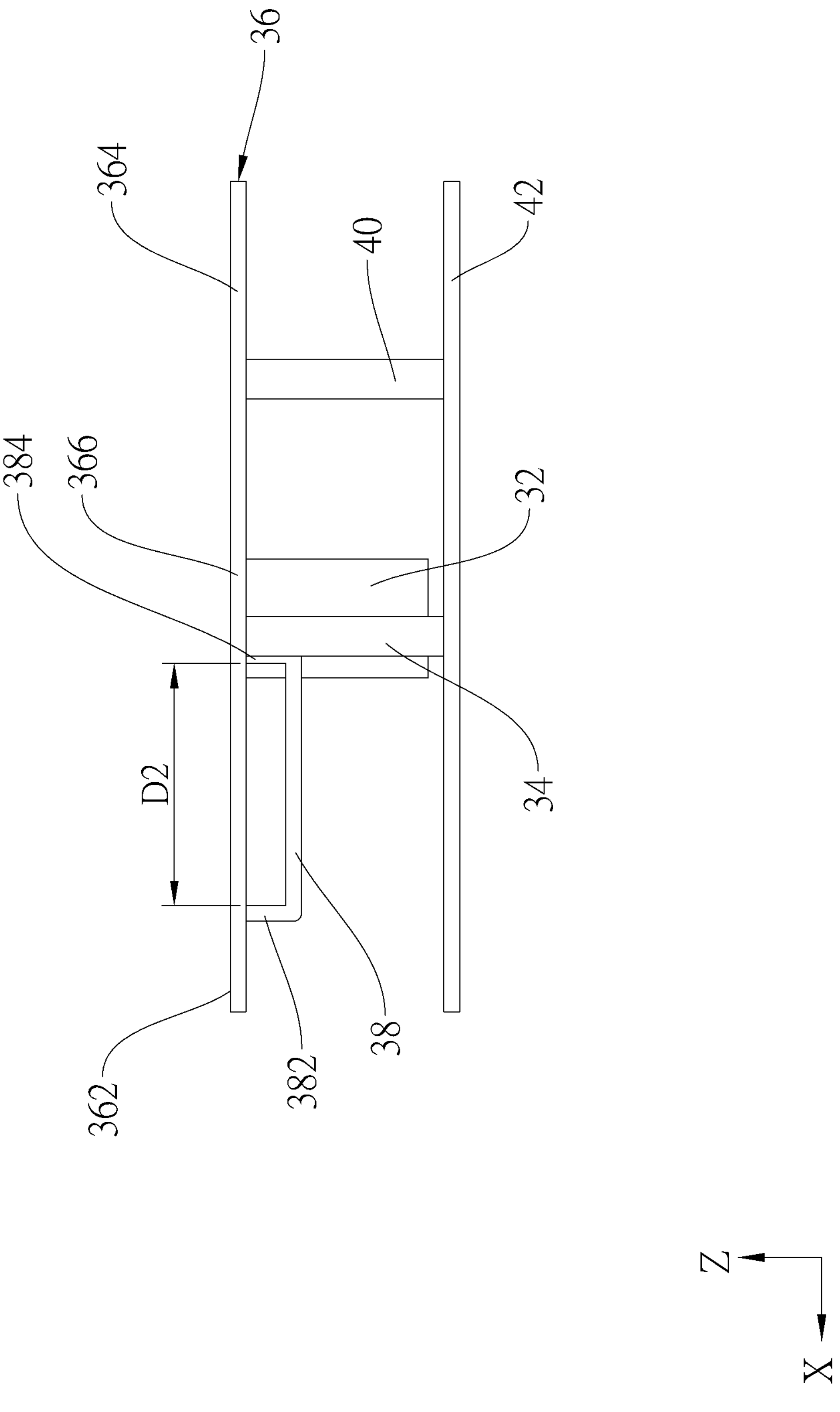
FIG. 16 is a rear view of the multiband antenna according to the second embodiment of the present invention.
Figure 17:
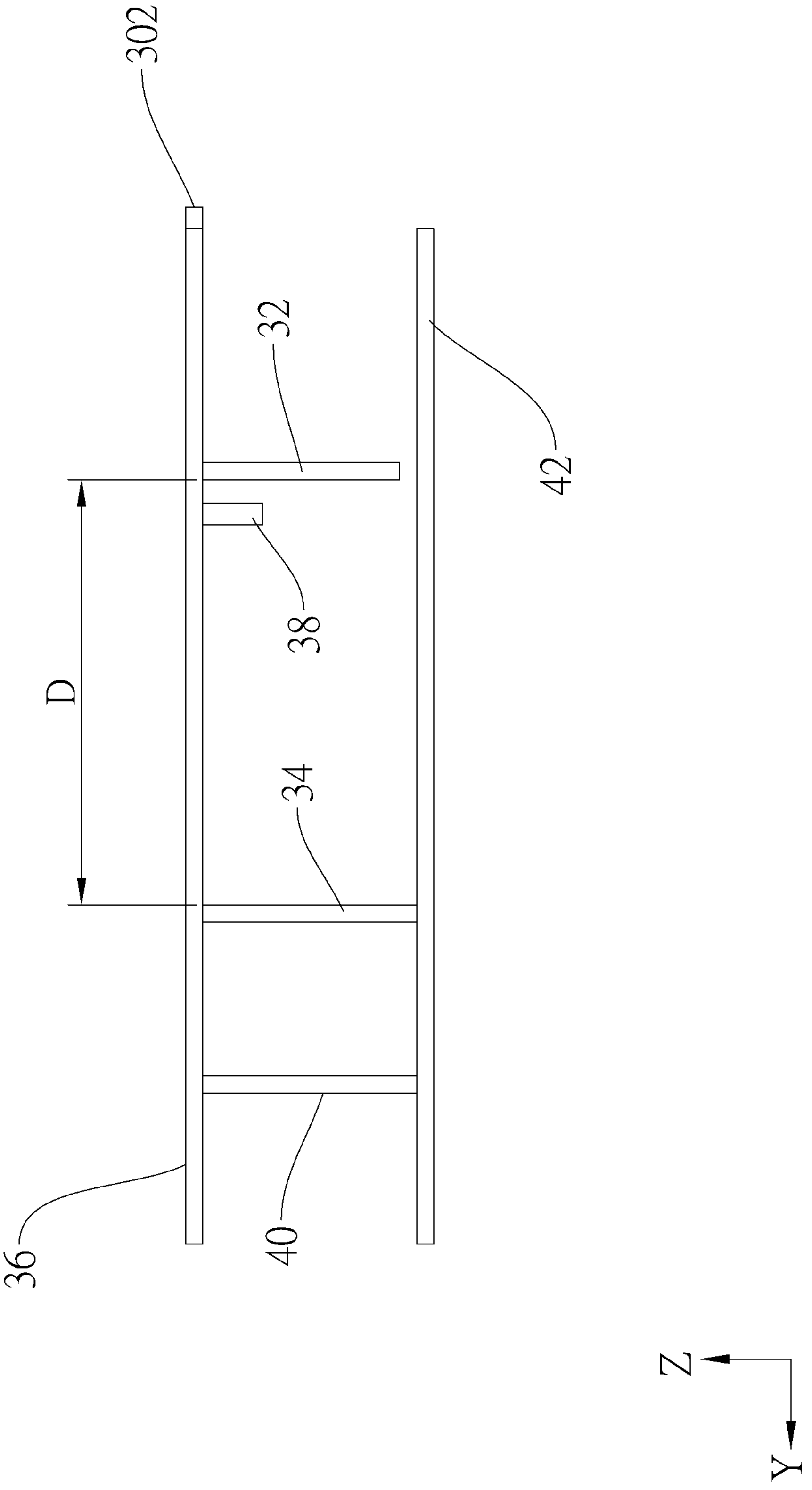
FIG. 17 is a left side view of the multiband antenna according to the second embodiment of the present invention.
Figure 18:
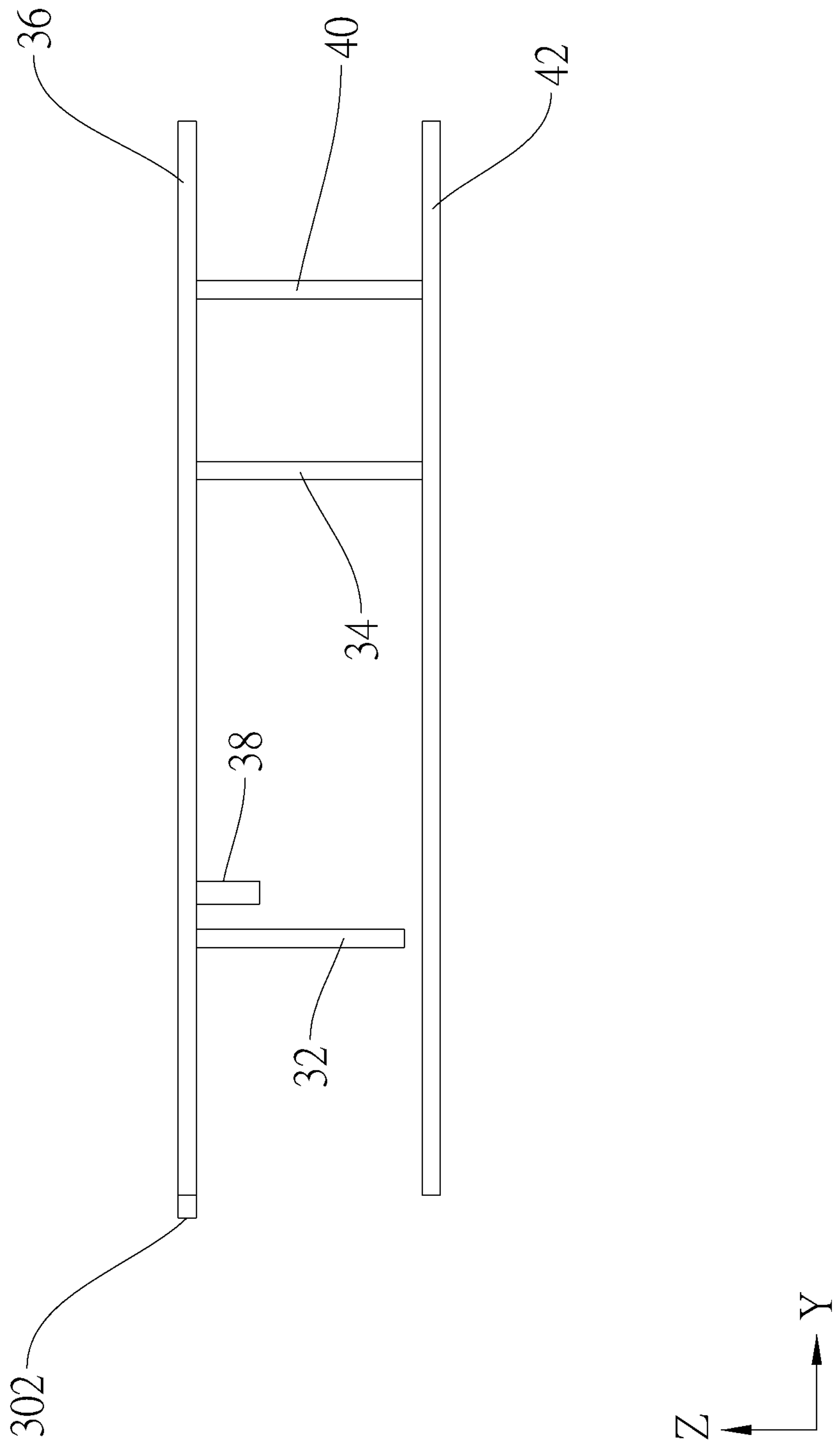
FIG. 18 is a right side view of the multiband antenna according to the second embodiment of the present invention.
Figure 19:
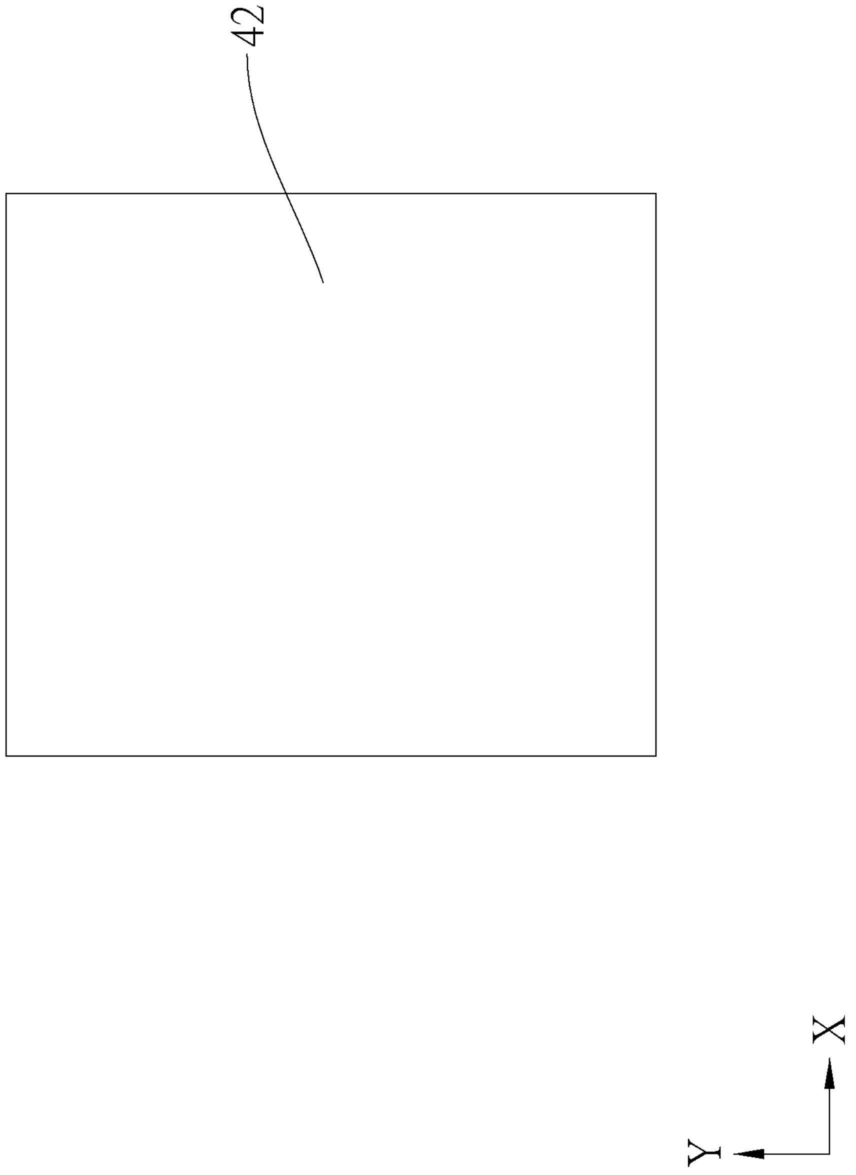
FIG. 19 is a bottom view of the multiband antenna according to the second embodiment of the present invention.

Referring to FIG. 9 to FIG. 12, FIG. 10 is a schematic view showing a radiation pattern of the multiband antenna 1 disposed in another direction corresponding to FIG. 9 and operating at 2.45 GHz, FIG. 11 is a schematic view showing a radiation pattern of the multiband antenna 1 disposed in the another direction corresponding to FIG. 9 and operating at 5.5 GHz, and FIG. 12 is a schematic view showing a radiation pattern of the multiband antenna 1 disposed in the another direction corresponding to FIG. 9 and operating at 6.5 GHz. It can be seen from FIG. 10 to FIG. 12, the multiband antenna 1 is omni-directional at 2.45 GHz, 5.5 GHz, and 6.5 GHz, and is suitable for different types of wireless communication products.

A multiband antenna 2 according to a second embodiment of the present invention is illustrated in FIG. 13 to FIG. 19 and has almost the same structure as that of the first embodiment, which also includes a first radiator 30, a feed element 32, a first ground element 34, a second radiator 36, a connecting element 38, a second ground element 40, and a substrate 42. In order to illustrate easily, a first axial direction X, a second axial direction Y, and a third axial direction Z which are perpendicular to one another should be interpreted from a perspective in FIG. 13. The difference between the first embodiment and the second embodiment is that the first radiator 30 in the second embodiment is a rectangular metal plate, wherein a width of the first radiator 30 in the first axial direction X is the same as a width of the feed element 32 in the first axial direction X. The second radiator 36 includes a first arm 362, a second arm 364, and a connecting section 366, wherein the first arm 362 and the second arm 364 are parallel to each other and extend along the second axial direction Y. The connecting section 366 extends along the first axial direction X, wherein two ends of the connecting section 366 are respectively connected to the first arm 362 and the second arm 364, making the second radiator 36 in a shape having three edges and an open side 368*a*. An end of the connecting element 38 is located between the feed element 32 and the first ground element 34 in the second axial direction Y and is located in a position closer to the feed element 32 than the first ground element 34. The second ground element 40 is connected to a position of the second arm 364 closer to the connecting section 366 than the open side 368*a*. An edge 302 of the first radiator 30 protrudes out of the open side 368*a* of a receiving groove 368 of the second radiator 36 in the second axial direction Y. In the current embodiment, the edge 302 of the first radiator 30 protrudes, but not limited to, 0.5 mm relative to the open side 368*a* of the receiving groove 368 of the second radiator 30.

In the current embodiment, a length L of the first radiator 30 in the second axial direction Y is 17.225 mm, a width W of the edge 302 in the first axial direction X is 3 mm, a distance D spaced between the first ground element 34 and the feed element 32 in the second axial direction Y is 9.95 mm, a length L1 of the second radiator 36 in the second axial direction Y is 23.75 mm. The second radiator 36 has two ends in the second axial direction Y, wherein a width W1 of one of the two ends of the second radiator 36 in the first axial direction X is 21 mm, and a width W2 of the other end of the second radiator 36 in the first axial direction X is 21 mm. The edge 302 of the first radiator 30 has two ends in the first axial direction X, wherein a distance D1 between one of the two ends of the edge 302 of the first radiator 30 and the first arm 362 in the first axial direction X and a distance D1 between the other end of the edge 302 of the first radiator 30 and the second arm 364 in the first axial direction X are respectively 4 mm. A distance D2 between two vertical sections 382, 384 of the connecting element 38 in the first axial direction X is 6.125 mm. A distance D3 between a surface 42*a* of the substrate 42 and a second surface 30*b* of the first radiator 30 in the third axial direction Z and a distance D3 between the surface 42*a* of the substrate 42 and a fourth surface 36*b* of the second radiator 36 in the third axial direction Z are respectively 5 mm. However, the aforementioned parameters are not a limitation of the present invention. The multiband antenna 2 of the current embodiment is also suitable for three frequency bands (i.e., from 2.4 GHz to 2.5 GHz, from 5.15 GHz to 5.85 GHz, and from 5.925 GHz to 7.125 GHz) and is omni-directional as well.

The second radiator in the first embodiment is the V-shaped metal plate, and the second radiator in the second embodiment is the metal plate in the shape having the three edges. In practice, the second radiator could also be a metal plate having a receiving groove and in a shape, such as a semi-circle and an ellipse, which surrounds the outer side of the first radiator.

With the aforementioned design, as the multiband antenna of the present invention feeds a signal via one feed element and has two radiators suitable for transmitting signals in multiple frequency bands, the multiband antenna of the present invention could be applied to multiple frequency bands in 2 GHz, 5 GHz, 6 GHz, and even 7 GHz and have greatly omni-directional, thereby could be applied to different types of wireless communication products and effectively relieve a drawback of a conventional wireless communication device that require a plurality of antennas.

It must be pointed out that the embodiments described above are only some preferred embodiments of the present invention. All equivalent structures which employ the concepts disclosed in this specification and the appended claims should fall within the scope of the present invention.

What is claimed is:

1. A multiband antenna, comprising:

a first radiator made of a metal plate;

a feed element electrically connected to the first radiator and adapted to feed a signal;

a first ground element electrically connected to the first radiator and adapted to ground the first radiator;

a second radiator made of a metal plate and surrounding a part of an outer side of the first radiator, wherein the first radiator and the second radiator are spaced by an interval;

a connecting element electrically connected to the first radiator and the second radiator; and a second ground element electrically connected to the second radiator and adapted to ground the second radiator;

wherein the first radiator has a first surface and a second surface opposite to the first surface, and the second radiator has a third surface and a fourth surface opposite to the third surface; the first surface and the third surface face the same direction; the feed element and the first ground element are located on a side of the second surface and are respectively connected to the second surface; the second ground element is located on a side of the fourth surface and is connected to the fourth surface;

wherein the second radiator comprises a first arm and a second arm that are respectively located on two opposite sides of the first radiator; an end of the connecting element is connected to the first arm, and the second ground element is connected to the second arm.

2. The multiband antenna as claimed in claim 1, wherein the second radiator has a receiving groove having an open side and a closed side, and at least one part of the first radiator is located in the receiving groove.

3. The multiband antenna as claimed in claim 2, wherein a width of the receiving groove gradually decreases from the open side to the closed side, and a width of the first radiator gradually decreases along a direction from the open side to the closed side.

4. The multiband antenna as claimed in claim 2, wherein the first radiator has an edge protruding relative to the open side of the receiving groove.

5. The multiband antenna as claimed in claim 1, wherein the connecting element is located on the side of the second surface and the side of the fourth surface, and two ends of the connecting elements are respectively connected to the second surface and the fourth surface.

6. The multiband antenna as claimed in claim 5, wherein the connecting element has two vertical sections and a horizontal section; an end of one of the two vertical sections is connected to the second surface, and an end of the other vertical section is connected to the fourth surface; two ends of the horizontal section respectively connected to another end of the two vertical sections.

7. The multiband antenna as claimed in claim 1, further comprising a substrate spaced with the second surface and the fourth surface, wherein the first ground element is connected between the substrate and the second surface, and the second ground element is connected between the substrate and the fourth surface.

8. The multiband antenna as claimed in claim 7, wherein the first radiator is supported on the substrate by the first ground element, and the second radiator is supported on the substrate by the second ground element.

9. The multiband antenna as claimed in claim 1, wherein a receiving groove is formed between the first arm and the second arm of the second radiator; the first radiator has two side edges; one of the two side edges of the first radiator is spaced with and parallel to the first arm, and the other side edge is spaced with and parallel to the second arm.

* * * * *